United States Patent
Biddulph et al.

[11] Patent Number: 5,269,976
[45] Date of Patent: Dec. 14, 1993

[54] LIQUID-VAPOUR CONTACT COLUMNS

[75] Inventors: Michael W. Biddulph, University Park; Alan C. Burton, Witney, both of England

[73] Assignee: The BOC Group, plc, Windlesham, England

[21] Appl. No.: 971,364

[22] Filed: Nov. 4, 1992

[30] Foreign Application Priority Data

Nov. 14, 1991 [GB] United Kingdom ............... 9124241

[51] Int. Cl.⁵ .............................................. B01F 3/04
[52] U.S. Cl. .............................................. 261/114.1
[58] Field of Search .................................... 261/114.1

[56] References Cited

U.S. PATENT DOCUMENTS

| | | |
|---|---|---|
| 2,877,099 | 3/1959 | Bowles . |
| 3,338,567 | 8/1967 | Hardouin et al. ............... 261/114.1 |
| 3,417,975 | 12/1968 | Williams et al. ............... 261/114.1 |
| 3,759,498 | 9/1973 | Matsch ........................... 261/114.1 |
| 4,105,723 | 8/1978 | Mix .................................. 261/114.1 |
| 4,184,857 | 1/1980 | Iijima et al. . |
| 4,620,952 | 11/1986 | Hsieh . |
| 4,954,294 | 9/1990 | Bannon ........................... 261/114.1 |

FOREIGN PATENT DOCUMENTS

| | | |
|---|---|---|
| 0170406 | 2/1986 | European Pat. Off. . |
| 764103 | 9/1952 | Fed. Rep. of Germany ... 261/114.1 |
| 1381560 | 10/1963 | France . |
| 1053841 | 11/1983 | U.S.S.R. ........................... 261/114.1 |
| 1660711 | 7/1991 | U.S.S.R. ........................... 261/114.1 |

*Primary Examiner*—Tim Miles
*Attorney, Agent, or Firm*—David M. Rosenblum; Larry R. Cassett

[57] ABSTRACT

A liquid-vapour contact column includes an array of vertically spaced horizontal liquid-vapour contact trays having generally circumferential sides and arrangement of downcomers to conduct liquid from each tray in the array to the tray below. Each tray has gas passages to enable gas to pass into contact with the liquid. A weir is disposed on the floor of at least one downcomer. Each side of the weir is spaced from the corresponding side of the downcomer. This arrangement counteracts a tendency for liquid flowing along the floor of the downcomer to become detached from the sides of the downcomer, such detachment leading to maldistribution of liquid on the tray and hence to less efficient operation of the column.

10 Claims, 3 Drawing Sheets

LIQUID-VAPOUR CONTACT COLUMNS

The present invention relates to liquid-vapour contact columns.

Liquid-vapour contact columns find wide use in industry in a number of different processes. For example, such columns may be employed to effect fractional distillation and are used in the separation of gas mixtures such as air.

A conventional liquid-vapour contact column includes a large number of horizontal trays which are spaced apart vertically. Each tray has a major portion of its surface formed with a multiplicity of generally uniformly spaced vapour passages therethrough. Conventionally, such liquid-vapour contact trays are each generally circular in shape but with two opposed segments omitted. One such segment is entirely open such that the tray has a chordal edge contiguous with its circular edge. The circular edge of the tray makes a sealing engagement typically with the column wall. The chordal edge of the tray provides the liquid outlet. A corresponding segment opposite the open one receives liquid from the tray above. This liquid receiving segment is imperforate. The active area of the tray, that is the area over which the liquid-vapour contact takes place, is that between the imperforate segment and the open segment; in use, liquid flows across the tray from the former segment to the outlet. The trays are arranged such that the open segment of an upper tray lies vertically above the imperforate section of the tray immediately therebelow. The direction of the liquid flow on one tray is therefore opposite to its direction on the tray below and the tray above. Liquid is conducted generally vertically downwards from the outlet of one tray to the inlet of the tray below by a device known as a downcomer. The imperforate segment associated with the tray below forms the floor of the downcomer and may be integral with this tray or joined thereto. Each downcomer has a guide plate, (typically secured to the outlet edge of the tray above) which co-operates with the column wall to define a passage having an outlet defined between the bottom edge of the guide plate and the chord bounding the imperforate segment of the lower tray. In the terminology used in the art, the guide plate is often referred to as the downcomer "curtain" and the imperforate segment of the tray as the downcomer "apron".

It is well known in the art that flow maldistribution on such liquid-vapour contact trays can have a significant detrimental effect on their operating efficiencies. Several qualitative descriptions of the flow patterns on such trays have been postulated. Such descriptions have identified the presence of stagnant regions and/or recirculation at the sides of each tray.

Various means have been proposed to ameliorate the problem of flow maldistribution on a distillation tray. For example, rather than relying on a hydraulic or liquid gradient to cause flow of liquid across a tray from its inlet to its outlet, U.S. Pat. No. 3,417,975 proposes employing in addition to the conventional uniform pattern of fixed size openings or perforations within walls normal to the tray surface, a uniform pattern of obliquely inclined openings, the latter being oriented in the downstream direction of liquid flow. Such slotted sieve trays, as they have been called, are said to perform with improved efficiency owing to the elimination of longitudinal hydraulic gradient in the liquid on the tray.

The neutralisation of the hydraulic gradient is stated to produce uniform resistance to vapour penetration through the liquid on the tray, and both vapour and liquid flows are distributed more evenly over the tray. In order to provide improved uniformity on such a tray, U.S. Pat. No. 3,759,498 discloses employing bubble promoters near the liquid inlet on the tray with a view to preventing areas of inactivity occurring in the vicinity of the inlet. This, we believe, has the effect of tending to overburden the tray with liquid in the vicinity of the liquid outlet. U.S. Pat. No. 3,759,498 also teaches employing a non-uniform distribution of the oblique slots (though it still employs the conventional uniform distribution of the conventional perforations) with there being a greater slot density in that half of the tray nearer the liquid outlet than in that half nearer the liquid inlet so as to counteract this problem. As a further measure specifically intended to enhance the liquid flow at the periphery of the tray, those slots in peripheral parts of the outlet half of the tray point in the direction of the liquid outlet so that the thrust imparted by the vapour to the liquid is in the direction of the outlet and thus the liquid at the periphery of the tray is urged towards the outlet and is prevented from dwelling for too long a period of time. U.S. Pat. No. 3,759,498 further teaches trying to equalise over the whole active surface of the tray the product of the liquid or froth height and the volumetric fraction of the liquid in the froth.

We believe that such approaches to improving tray efficiency can achieve only partial success and suffer from the disadvantage that they add complexity to the design and manufacture of the tray.

An alternative approach is to ameliorate the adverse consequences of flow maldistribution on a liquid-vapour contact tray. This is the approach that is adopted by the invention according to European patent application 0 170 406A. European patent application 0 170 406A proposes employing a non-uniform distribution of perforations, with the stagnant regions at the sides of the tray having a lower percentage open area than the rest of the liquid-vapour contact surface of the tray. It is to be appreciated, however, that owing to the complexities of the flow regime that is established on the tray, the degree of improvement thereby made possible, although useful, is limited.

It is also known to provide on the inlet portion of a tray a weir downstream of the bottom edge of the guide plate so as to control the flow of liquid onto the active portion of the tray. Such an "inlet weir" tends however to require the tray to have a reduced active area in comparison with trays using conventional downcomer arrangements. Moreover, the weir tends to create a large liquid crest disrupting smooth flow of liquid onto the active area of the tray.

It is an aim of the present invention to provide in a liquid-vapour contact column a downcomer which under certain flow regimes helps to combat the problem of liquid flow maldistribution.

SUMMARY OF THE INVENTION

According to the present invention there is provided a liquid-vapour contact column including an array of vertically spaced horizontal liquid-vapour contact trays having generally circumferential sides and an arrangement of downcomers to conduct liquid from each tray in the array to the tray below, each tray having gas passages therethrough to enable gas to pass into contact with the liquid, characterised in that on the floor of at least one downcomer there is a flow impedance member, each side of the flow impedance member being spaced from a corresponding side of the downcomer.

The term "gas" as used herein includes a vapour within its scope.

It has been observed that under certain liquid flow regimes, liquid flowing along the floor of a downcomer tends to become detached from its sides leading to maldistribution of liquid over the active surface of the tray that receives liquid from the downcomer. We have found that the said flow impedance within the downcomer counteracts the tendency for such detachment to take place. In so far as the flow impedance member regulates the momentum of the liquid flowing over a central portion of the inlet of the tray with which it is associated, the flow impedance member acts as a weir and will be referred to as such hereinbelow.

The active area of each tray preferably has a chordal inlet edge which forms the boundary between the tray and the floor of the downcomer from which, in use, it receives liquid. The said downcomer floor may be flat and is typically integral with the tray. The guide plate of the said downcomer preferably terminates in a bottom edge which lies parallel to and vertically above the chordal inlet edge of the tray which in use receives liquid therefrom. The weir on the downcomer floor is preferably parallel to the chordal inlet of this tray and preferably has a length of at least 50% (more preferably from 70 to 80%) of the length of the inlet. The gap between one side of the weir and the side of the downcomer proximate thereto is preferably equal in length to the gap between the other side of the weir and the other side of the downcomer. Accordingly, there is no tendency for the liquid flow to be greater on one side of the downcomer outlet than the other.

The weir is preferably disposed vertically. The height of the weir is preferably approximately equal to the clearance between the bottom edge of the guide plate associated with the downcomer in which the weir is located and the floor of the tray therebelow. Such an arrangement helps to provide a liquid seal against back flow of vapour at the bottom edge of the downcomer guide plate.

The weir may be a solid or perforate member or may be formed, for example, of expanded metal.

Each tray is preferably of the sieve kind.

Typically, all the downcomers are each provided with a weir in accordance with the invention.

The liquid-vapour contact column may, for example, be used in the separation of air by rectification.

BRIEF DESCRIPTION OF THE DRAWINGS

A liquid-vapour contact column in accordance with the invention will now be described by way of example with reference to the accompanying drawings, in which.

DETAILED DESCRIPTION

Figure 1:
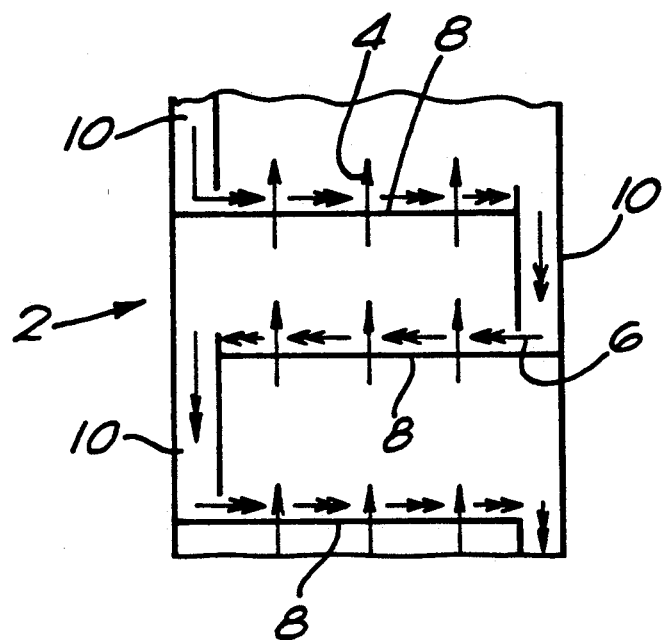
FIG. 1 is a schematic drawing of part of a liquid-vapour contact column showing the flow of liquid from tray to tray.

Referring to FIG. 1 of the drawings, the flow paths of liquid and vapour through a section of a liquid-vapour contact column 2 are shown. The single-headed arrows 4 indicate vapour flow and the double headed arrows 6 indicate liquid flow. These trays 8 and three downcomers 10 are shown. It will be noted that the direction of liquid flow on the middle tray 8 (as shown) as opposed to the direction of flow on the other trays 8.

Figure 2:
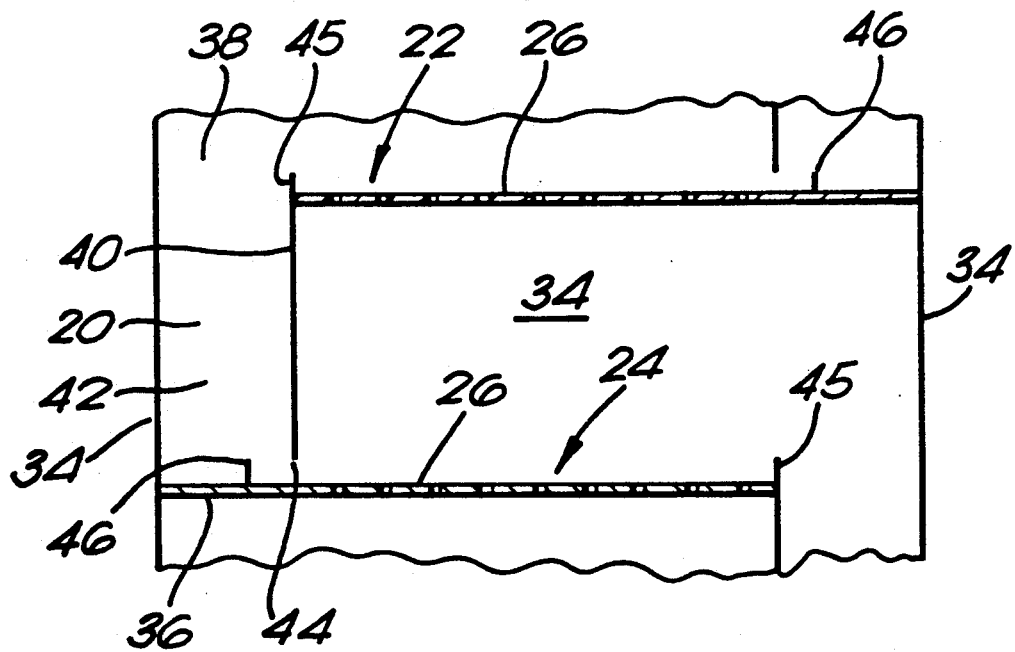
FIG. 2 is a schematic side view of part of a distillation column showing a downcomer in accordance with the invention.
Figure 3:
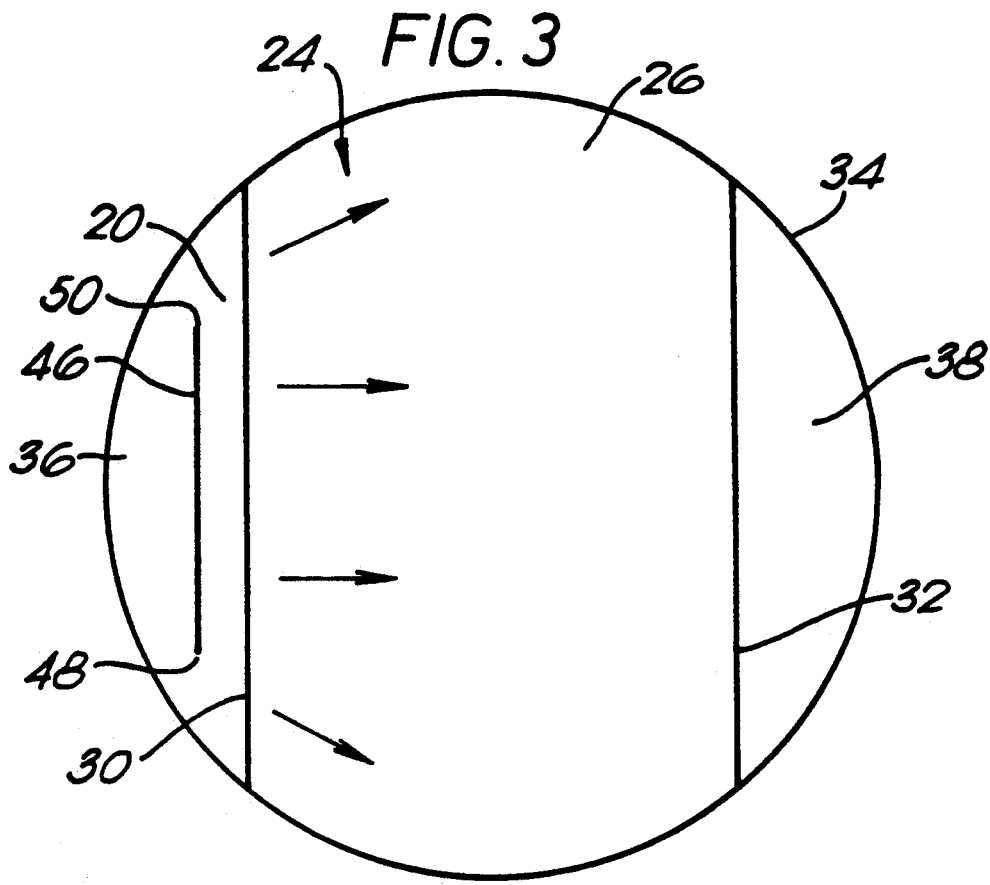
FIG. 3 is a plan view of the lower tray shown in FIG. 2.

Referring now to FIGS. 2 and 3 of the drawings, there is shown a downcomer 20 suitable for use in the column in FIG. 1. As shown in FIG. 2, a downcomer conducts liquid from an upper sieve tray 22 to a lower sieve tray 24. The sieve trays 22 and 24 each have a perforate active area 26 in the shape of a circle with two diametrically opposed segments of equal size to one another omitted. The active area 26 therefore has a chordal inlet edge 30 opposite a complementary chordal outlet edge 32. The circumferential sides of the active area 26 make a sealing engagement with the inner surface of the wall 34 of the column.

The segment defined by the column wall 34 and the inlet edge 30 of the active area 26 of the tray 24 is occupied by a plate 36 having a flat imperforate upper surface forming the floor of the downcomer 20, and shall be referred to below as the downcomer floor (or apron) 36. The downcomer floor 36 is typically integral with the active area 26. The segment defined by the column wall 34 and the outlet edge 32 of the tray 22 is open and forms an inlet 38 to the downcomer 20.

The downcomer 20 also includes a vertical guide plate (or "curtain") 40 depending from the upper tray 22 and defining a downcomer passage 42 with the column wall 34 extending vertically downwards from the inlet 38 to the floor 36. The plate 40 has a bottom edge 44 spaced vertically a chosen distance above the inlet edge 30 of the tray 24. In operation, liquid flows over the edge 32 of the upper tray 22, down the passage 42 and through the gap defined between the bottom edge 44 of the guide plate 40 and the inlet edge 30 of the tray 24.

If desired, the trays 22 and 24 may each have an outlet weir 45 extending along the whole length of their outlet edges 32.

In accordance with the invention, a weir 46 extends vertically upwards from the floor 36 of the downcomer 20. The height of the weir 46 is approximately equal to the clearance between the bottom edge 44 of the guide plate 40 and the edge 30 of the tray 24. The weir 46 extends along a chord parallel to the inlet edge 30 of the tray 24 but does not extend for the full length of this chord. Instead, the sides 48 and 50 of the weir 46 are spaced from the column wall 34. The spacing from the column wall on the respective sides 48 and 50 are the same as one another. The chordal length of the weir 46 is approximately 75% of that of the edge 30. The diametric distance between the weir 46 and the edge 30 is approximately equal to the vertical clearance between the bottom edge 44 of the guide plate 40 and the inlet edge 30 of the tray 24.

If desired, the trays 22 and 24 may each have an outlet weir 45 extending along the whole length of the their outlet edges 32.

In accordance with the invention, a weir 46 extends vertically upwards from the floor 36 of the downcomer 20. The height of the weir 46 is approximately equal to the clearance between the bottom edge 44 of the guide plate 40 and the edge 30 of the tray 24. The weir 46 extends along a chord parallel to the inlet edge 30 of the tray 24 but does not extend for the full length of this chord. Instead, the sides 48 and 50 of the weir 46 are spaced from the column wall 34. The spacing from the column wall on the respective sides 48 and 50 are the same as one another. The chordal length of the weir 46 is approximately 75% of that of the edge 30. The diametric distance between the weir 46 and the edge 30 is approximately equal to the vertical clearance between the bottom edge 44 of the guide plate 40 and the inlet edge 30 of the tray 24.

In operation, the weir 46 is able to improve flow distribution of the liquid across the active surface area 26 of the tray 24. The manner in which this result is achieved is considered below.

We believe that flow separation is a significant problem on distillation trays. Flow separation occurs when a boundary layer of flowing liquid becomes detached from the wall of a vessel or surface of an object as a result of viscous forces and an unfavourable pressure gradient. The most common example of flow separation is the flow of a liquid past a cylinder or sphere. Separation occurs at a point called the point of detachment, the position of which depends on the velocity and turbulence of the liquid. For the case of a distillation tray, areas of enclosed recirculation occur, hence as well as a detachment point there must be a point of attachment, where the pressure gradient has evened out again.

Figure 4:
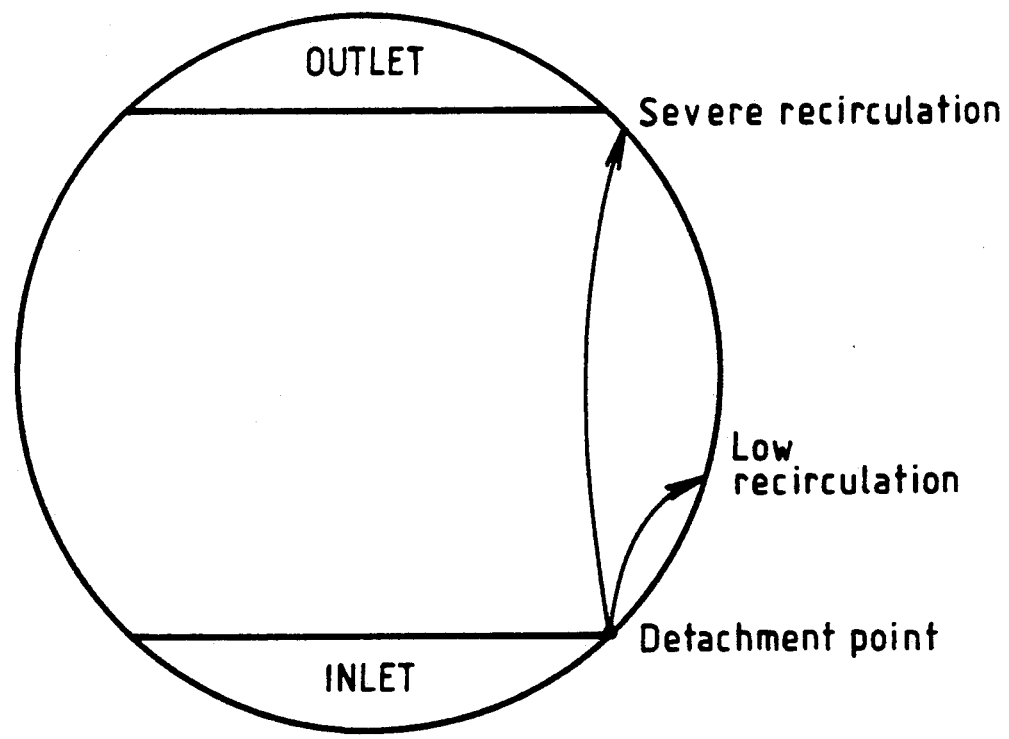
FIG. 4 is a schematic drawing of a tray illustrating the principle of liquid flow attachment.

Provided there is a uniform flow of liquid under the bottom edge of the guide plate or downcomer curtain, one would expect the point of detachment of the liquid flow always to occur at the two points where the inlet edge of the active area of the tray meets its circumference. One of these points is shown in FIG. 4. The reason for this expectation is that these points represent the points where the tangent to the column wall is at the greatest angle to the bulk flow direction. (In practice, we have found that the point of detachment can occur in a more upstream position, i.e. in the downcomer itself.) The point of attachment varies depending on the severity of the recirculation. Slight flow recirculation is characterised by the point of attachment being close to the inlet. Maximum recirculation occurs when the point of attachment occurs at the tray outlet.

Accordingly, by determining the point of attachment, one is able to obtain an indication of the amount of recirculation that takes place. Thus, the arc subtended by a first radius extending from the center of the tray to the point of attachment and a second radius extending from the center of the tray to the point of detachment (assumed to be at the point shown in FIG. 4) provides an indication of the degree of recirculation, the greater the angle of the arc the greater the degree of recirculation.

We have located the point of detachment for different liquid loadings by injecting dye at a number of ports along the wall of an experimental column. If dye is injected into a recirculating region, then it flows back towards the inlet of the tray; if injected in a forward flow region, it flows downstream towards the outlet. The point of attachment is thus the point at which dye flows equally upstream and downstream from the injection point. It is to be appreciated that such experimental methodology does not permit the point of attachment to be determined exactly but does enable the location to be determined within, we believe, at worst, plus or minus 5 cm. Moreover, results are reproducible to within the same accuracy.

Using a conventional sieve tray, that is to say a tray without a weir in the downcomer that feeds liquid to it, we have found from such dye tests that as the vertical clearance between the bottom edge of the downcomer curtain and the floor of the tray is increased, so the amount of recirculation passes through a minimum. This result suggests that there are two contrasting mechanisms responsible for such recirculation. The first mechanism, explaining the decrease in recirculation with increasing underflow clearance, is that there tends to be a significant liquid back-up in the downcomer and the flow under the downcomer curtain is uniform across the inlet. In this mechanism, flow separation is thus caused by the reverse pressure gradient at the inlet as a result of a high velocity onto the tray and the curvature of the column wall. As the underflow clearance beneath the downcomer curtain is increased, the velocity under the downcomer decreases and recirculation reduces until a minimum is reached. The increase in recirculation as the clearance is increased again is caused by a second mechanism, whereby flow separation actually occurs in the downcomer itself. The downcomer thus acts to concentrate the flow from the tray above into the center of the apron. In the first mechanism, which occurs with smaller underflow clearances, liquid back-up in the downcomer serves to even out the flow along the inlet. For larger clearances, however, liquid flows across the center of the inlet unchecked and separation occurs. An emphatic demonstration of the second mechanism was the observation of dye injected at the side of the tray being sucked back up into the downcomer.

Moreover, we have also found by dye tests that the severity of recirculation tends to increase with increasing loading across the weir at the outlet of the tray and with the height of this weir.

The apparatus according to the invention is able to ameliorate flow recirculation caused by the second mechanism discussed above since the effect of the weir 46 is to provide an impedance to the central flow of liquid beneath the bottom edge 44 of the guide plate or curtain 40. Such impedance thus helps to prevent substantial disparities being created between the flow velocity of the liquid flowing under the curtain 40 at the sides of the downcomer 20 and that flowing centrally under the curtain 40. The weir 46 thereby counteracts any tendency for separation of the liquid flow from the column wall in the downcomer. Since the weir 46 tends not to reduce (and may in fact marginally increase) liquid back-up in a downcomer when there is a small clearance between the curtain 40 and the inlet edge 30, a downcomer in accordance with the invention is preferably designed such that this clearance is relatively large, say, at least 50 mm. Large downcomer curtain clearances facilitate the operation of the tray with high liquid loadings, which is generally something to be desired. The relative ineffectiveness or any minor detrimental effect that a downcomer weir might have with small downcomer curtain clearances will therefore not be significant in large scale liquid-vapour contact columns.

Figure 5:
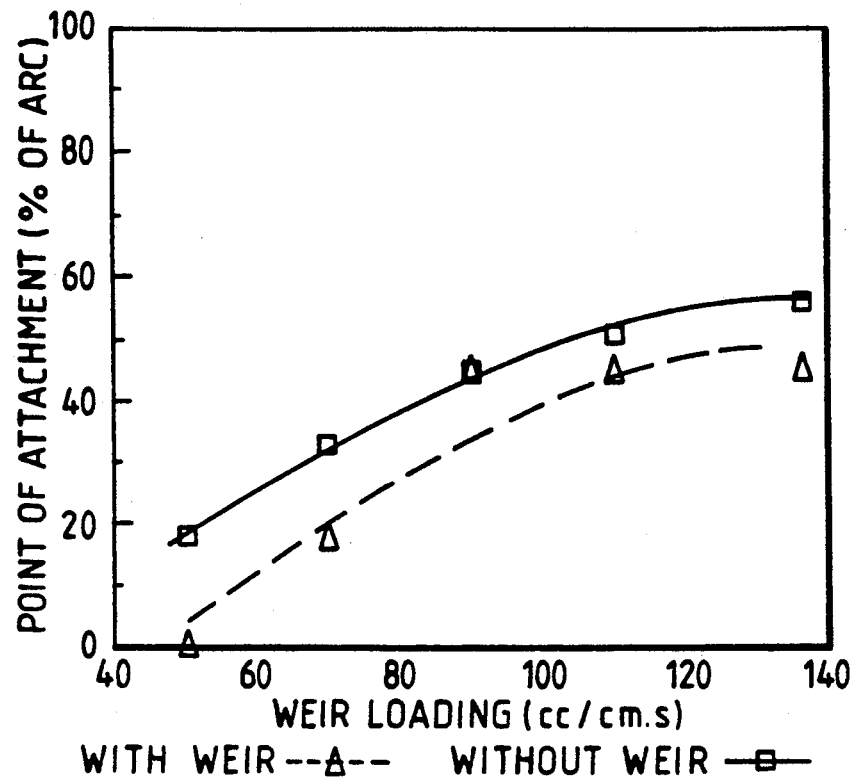
FIGS. 5 and 6 are graphs illustrating the performance of a liquid-vapour contact tray which has associated therewith a weir in its downcomer in accordance with the invention.
Figure 6:
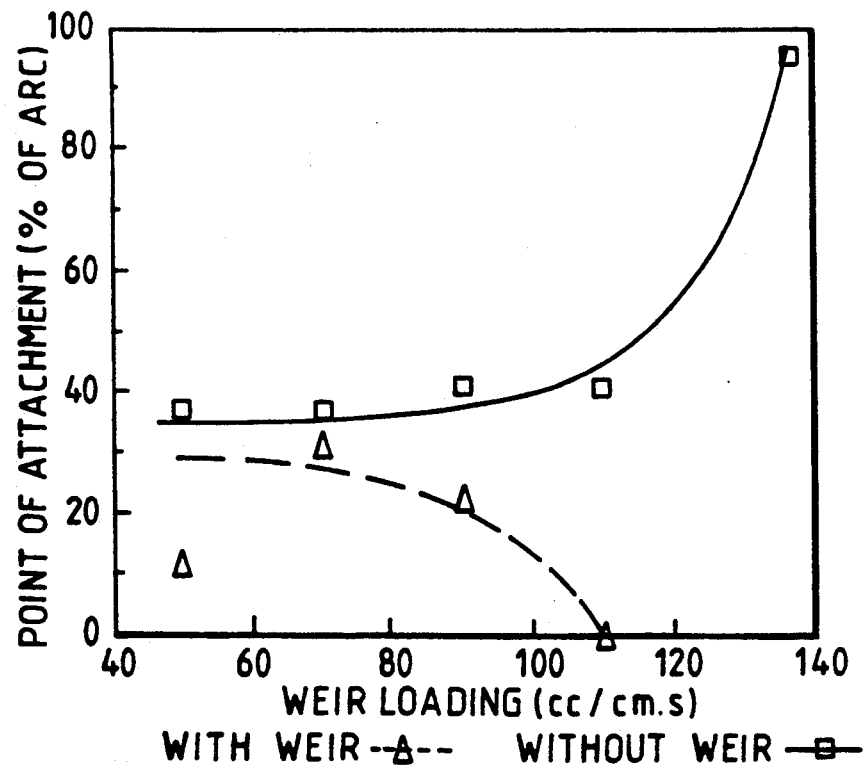

FIGS. 5 and 6 show results obtained by the dye test method using an experimental rig simulating the performance of the distillation tray, but using water as the liquid and air as the vapour. This experimental column had the following parameters:

Tray diameter: 1.81 m
Outlet weir length: 1.33 m
Tray spacing: 0.61 m
Under flow clearance: variable between 0 and 100 mm
Outlet weir height: variable between 0 and 50 mm
Open area of active portion of tray—8%
Perforation diameter: 1.8 mm
Superficial air velocity: variable up to 1 m/s
Outlet weir loading: variable up to 137 cm$^3$/cm.s FIG. 5 illustrates the performance of a tray with and without a weir in the downcomer that feeds liquid to it. In FIG. 5 the position of the point of attachment is plotted against outlet weir loading. The position of the point of attachment is expressed as a percentage of the arc between the inlet and outlet of the tray. Thus, a point of attachment at 100% of the arc indicates that the point of attachment occurs at the outlet (i.e. maximum recirculation) and a point of attachment of 0% indicates that there is no recirculation. The results shown in FIG. 5 were obtained with an under downcomer curtain clearance of 30 mm; a downcomer weir height of 30 mm and an outlet weir height of 50 mm. Curve A represents the performance of a tray without a weir in its feed downcomer and Curve B the performance of the tray with a weir in its downcomer. In both instances, the position of the point of attachment is displaced progressively towards the outlet of the tray with increasing outlet weir loading. For a given outlet weir loading, the point of attachment is nearer the outlet of the tray when no weir in the downcomer is employed.

FIG. 6 shows the same parameters as FIG. 5 but plotted for operation of the tray with an under downcomer clearance of 60 mm and a downcomer weir height of 60 mm. The height of the outlet weir remained 50 mm. It can be seen from FIG. 6 that the downcomer weir has a remarkable effect on the performance of the tray. Whereas when the tray is operated without a downcomer weir, the point of attachment moves towards the outlet of the tray with increasing outlet weir loading. That is to say, recirculation at the sides of the tray increases with increasing outlet weir loading. Moreover, it can be seen from Curve A that the rate of increase is particularly marked at high outlet weir loadings. In contrast, it can be seen from Curve B that when the downcomer is fitted with a weir in accordance with the invention, the results obtained indicated that the point of attachment moved nearer the inlet with increasing outlet weir loading, that is to say recirculation at the sides of the tray became less. Moreover, at high outlet weir loadings, i.e. above 110 cm$^3$/cm.s no recirculation whatever was observed. Since recirculation is known to have an adverse effect on the mass transfer performance of a distillation or other liquid-vapour contact tray, such an improvement is for practical purposes a particularly desirable result.

Referring again to FIGS. 2 and 3, it is preferred that the downcomer weir 46 be of a height substantially equal to the vertical clearance between the edge 44 of the curtain 40 and the inlet edge 30 of the tray 24. By choosing the weir 46 to be of such a height, the creation of a liquid seal at the edge 44 of the curtain 40 is facilitated. Such a liquid seal prevents vapour from passing upwardly through the active area 26 of the tray 24 into the downcomer 20. It is also preferred that the weir 46 extends in parallel to the inlet edge 30 for ease of construction and so as to give a consistent seal along the length of the weir. It should be appreciated that there is a degree of flexibility in setting the height of the weir 46 relative to the size of the clearance under the edge 44 of the curtain 40. However, if the weir is too low or too far away from the curtain 40 it be ineffectual in opposing the momentum of the liquid flowing on to the tray. There is also flexibility in setting the length of the weir 46 within the limits of its being long enough adequately to impede the central flow in the apron and create a liquid seal right across the inlet 30, but not being so long as to reduce the flow around its sides 48 and 50 to an inadequate size.

Although the invention has been described above in relation to a liquid-vapour contact column each of whose liquid-vapour contact trays has a downcomer floor generally coplanar therewith, it is equally applicable to arrangements in which each downcomer is dished, that is to say the downcomer floor lies below the level of the tray.

We claim:

1. A liquid-vapour contact column including: an array of vertically spaced horizontal liquid-vapour contact trays having generally circumferential sides; and an arrangement of downcomers to conduct liquid from each tray in the array to the tray below; each tray having gas passages therethrough to enable gas to pass into contact with the liquid; at least one of the downcomers being formed between a guide plate and a column wall and having a floor and a flow impedance member on said floor comprising a weir within said downcomer substantially parallel to and substantially uniformly spaced from said guide plate.

2. The liquid-vapour contact column as claimed in claim 1, wherein each tray has a chordal inlet edge, and the said guide plate having a bottom edge lying parallel to and vertically above the chordal inlet edge of the tray which in use receives liquid from said downcomer, and said weir is oriented parallel to that tray.

3. The liquid-vapour contact column as claimed in claim 2, wherein the length of said weir is from 70 to 80% the length of the chordal inlet edge of the tray which in use receives liquid from said downcomer.

4. The liquid-vapour contact column as claimed in claim 2, in which the height of said weir is equal to the clearance between the bottom edge of said guide plate and the inlet edge of said tray.

5. The liquid-vapour contact column as claimed in claim 1, in which the weir is one of a solid and a perforate member.

6. The liquid-vapour contact column as claimed in claim 1, in which the weir is a member formed of expanded metal.

7. The liquid-vapour contact column as claimed in claim 1, in which the sides of each downcomer are defined by the column wall.

8. The liquid-vapour contact column as claimed in claim 1, in which the floor of said at least one downcomer is integral with the tray which in use receives liquid from said downcomer.

9. The liquid-vapour contact column as claimed in claim 1, in which the space between one side of the weir and the side proximate thereto of the said at least one downcomer is equal in length to the gap between the other side of the weir and the other side of the downcomer.

10. The liquid-vapour contact column as claimed in claim 1, in which said weir is of a size and position such that in use it creates a liquid flow out of the downcomer that provides a seal against the flow of gas from the tray back into the downcomer.

* * * * *